United States Patent
Abedini et al.

(10) Patent No.: US 11,646,787 B2
(45) Date of Patent: May 9, 2023

(54) UTILIZATION OF SENSOR INFORMATION BY REPEATERS

(71) Applicant: QUALCOMM Incorporated, San Diego, CA (US)

(72) Inventors: Navid Abedini, Basking Ridge, NJ (US); Jianghong Luo, Skillman, NJ (US); Junyi Li, Franklin Park, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/233,100

(22) Filed: Apr. 16, 2021

(65) Prior Publication Data

US 2022/0337309 A1  Oct. 20, 2022

(51) Int. Cl.
*H04B 7/155* (2006.01)
*H04L 5/14* (2006.01)

(52) U.S. Cl.
CPC .............. *H04B 7/1555* (2013.01); *H04L 5/14* (2013.01)

(58) Field of Classification Search
CPC ........ B60Q 1/0023; B60Q 1/12; B60Q 1/143; B60Q 1/24; B60Q 2300/42; B60Q 2300/45

See application file for complete search history.

(56) References Cited

U.S. PATENT DOCUMENTS

| | | | | |
|---|---|---|---|---|
| 2018/0158299 A1* | 6/2018 | Bogdan | ............ | G08B 13/19656 |
| 2020/0284883 A1* | 9/2020 | Ferreira | .................. | G01S 7/484 |
| 2020/0348662 A1* | 11/2020 | Cella | .................... | G06K 9/6263 |
| 2021/0045147 A1* | 2/2021 | Zhou | ................. | H04W 72/1289 |
| 2021/0291720 A1* | 9/2021 | Kulkarni | .................. | B60Q 1/12 |

* cited by examiner

*Primary Examiner* — Ayaz R Sheikh
*Assistant Examiner* — Debebe A Asefa
(74) *Attorney, Agent, or Firm* — Seyfarth Shaw LLP

(57) ABSTRACT

A method of wireless communication by a repeater includes collecting sensor information associated with an environment of the repeater. The method also includes receiving control information from a control node for a repeating operation. The method further includes repeating a wireless signal received from a first device towards a second device in accordance with the control information and the sensor information. A method of wireless communication by a control node includes collecting sensor information from a repeater. The sensor information is associated with an environment of the repeater. The method also includes generating control information for the repeater based on the sensor information, and transmitting the control information to the repeater.

30 Claims, 10 Drawing Sheets

UTILIZATION OF SENSOR INFORMATION BY REPEATERS

BACKGROUND

Field of the Disclosure

The present disclosure relates generally to wireless communications, and more specifically to utilization of sensor information at repeaters.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

In aspects of the present disclosure, a method of wireless communication by a repeater includes collecting sensor information associated with an environment of the repeater. The method further includes receiving control information from a control node for a repeating operation. The method still further includes repeating a wireless signal received from a first device towards a second device in accordance with the control information and the sensor information.

According to other aspects of the present disclosure, a method of wireless communication by a control node includes collecting sensor information from a repeater. The sensor information is associated with an environment of the repeater. The method also includes generating control information for the repeater based on the sensor information. The method still further includes transmitting the control information to the repeater.

Other aspects of the present disclosure are directed to an apparatus for wireless communication by a repeater having a memory and one or more processors coupled to the memory. The processor(s) is configured to collect sensor information associated with an environment of the repeater. The processors is further configured to receive control information from a control node for a repeating operation. The processor(s) is further configured to repeat a wireless signal received from a first device towards a second device in accordance with the control information and the sensor information.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
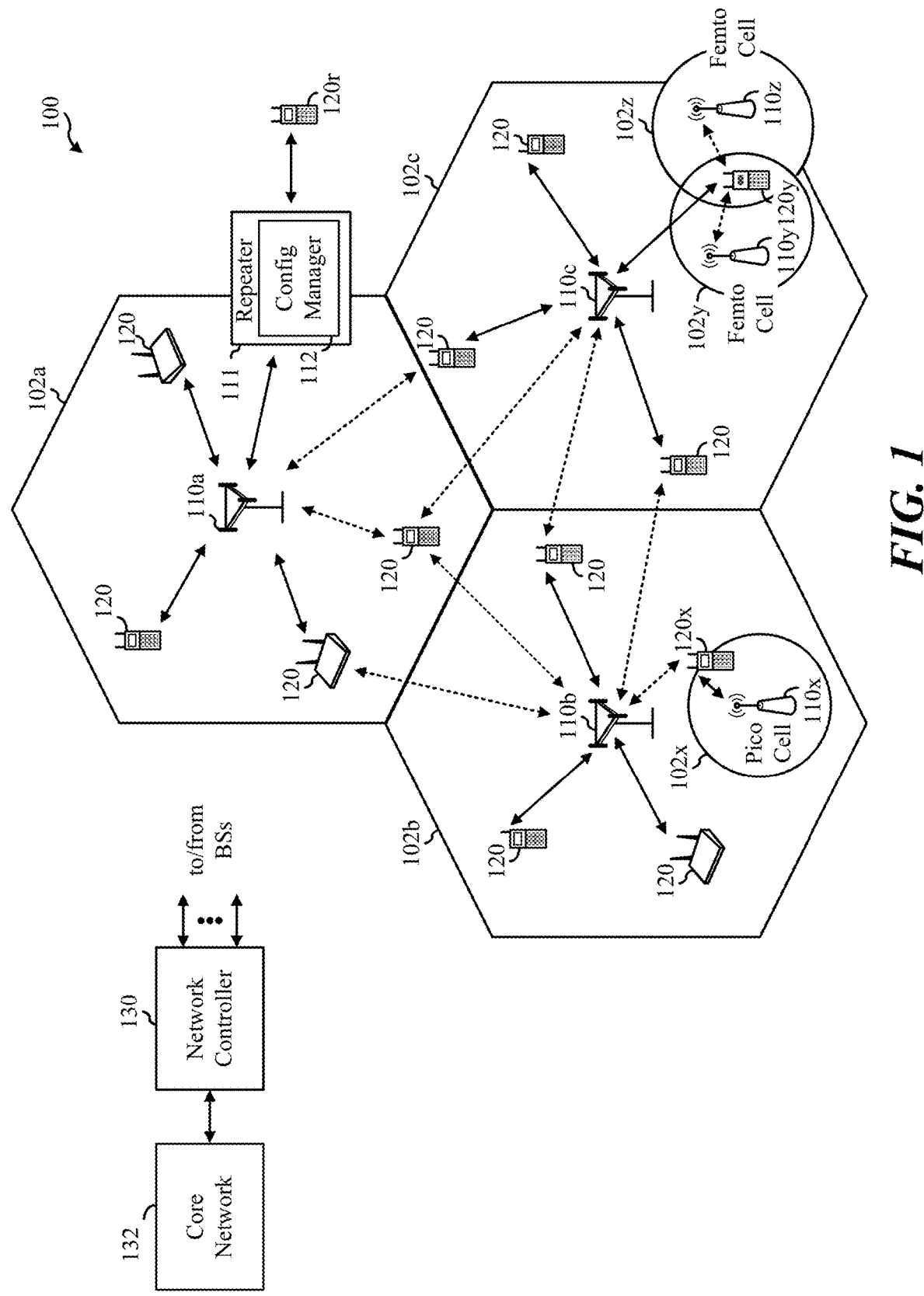
FIG. 1 is a block diagram conceptually illustrating an example telecommunications system, in accordance with certain aspects of the present disclosure.

Aspects of the present disclosure provide apparatus, methods, processing systems, and computer readable mediums for use of sensor information at repeaters. For example, as disclosed, a repeater may be configured collecting sensor information associated with an environment of the repeater, and receive control information from a control node for a repeating operation. Accordingly, the repeater may repeat a wireless signal in accordance with the control information and the sensor information.

The following description provides examples of use of sensor information by repeaters in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G new radio (NR) RAT network may be deployed.

The techniques described herein may be used for various wireless networks and radio technologies. While aspects may be described herein using terminology commonly associated with 3G, 4G, and/or 5G NR (new radio) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications (MTC) (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a diagram illustrating an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces, including a network controller 130. The network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

As illustrated in FIG. 1, the wireless communication network 100 may include a number of base stations (BSs) 110a-z (each also individually referred to as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The wireless communication network 100 may also include repeater stations (e.g., repeater 111), also referred to as relays or the like. Repeaters 111 may be used to enhance or extend an area of existing cell coverage (e.g., macro cell 102a) by amplifying a received signal, and transmitting the amplified signal to an upstream stat ion (e.g., UE 120r or BS 110a). In some examples, the repeater 111 is configured to perform forward error correction (FEC) on the received signal as well as amplification of the signal in a retransmission. In such an example, the repeater 111 may include an FEC decoder for demodulation and decoding of a received signal, an FEC encoder for modulation and encoding of a signal for retransmission, etc. A repeater 111 may be configured to receive a data transmission and/or other information from an upstream station (e.g., a BS 110a or a UE 120r), and send a retransmission of the data and/or other information to a downstream station (e.g., a UE 120 or a BS 110). In some examples, a repeater 111 may be configured to relay transmissions between two or more UEs 120, or one or more BSs 110 to facilitate communication between like devices.

Although FIG. 1 illustrates the repeater 111 as providing a communication path between a BS 110a of a macro cell 102a and a UE 102r outside of the macro cell 102a, it can be appreciated that the repeater 111 may provide communication paths between devices (e.g., BS 110a and a UE 120) within the same macro cell 102a, or devices in separate macro cells.

According to certain aspects, a repeater 111 may be configured for use of sensor information. As shown in FIG. 1, the repeater 111 includes a configuration manager 112. The configuration manager 112 may be configured to perform a sensing operation, as well as a configuration process. The sensing operation may obtain information about an environment of the repeater. The sensing operation may obtain radar data, light detection and ranging (LiDAR) data, in-band radio frequency (RF) power measurement data, or image data.

As noted, the configuration manager 112 may be configured to perform a configuration process. The configuration process may include receiving control information from a control node for a repeating operation. Based on the control information and the sensor information, the configuration process enables efficient repeating of a wireless signal received from an upstream device towards a downstream device.

Figure 2:
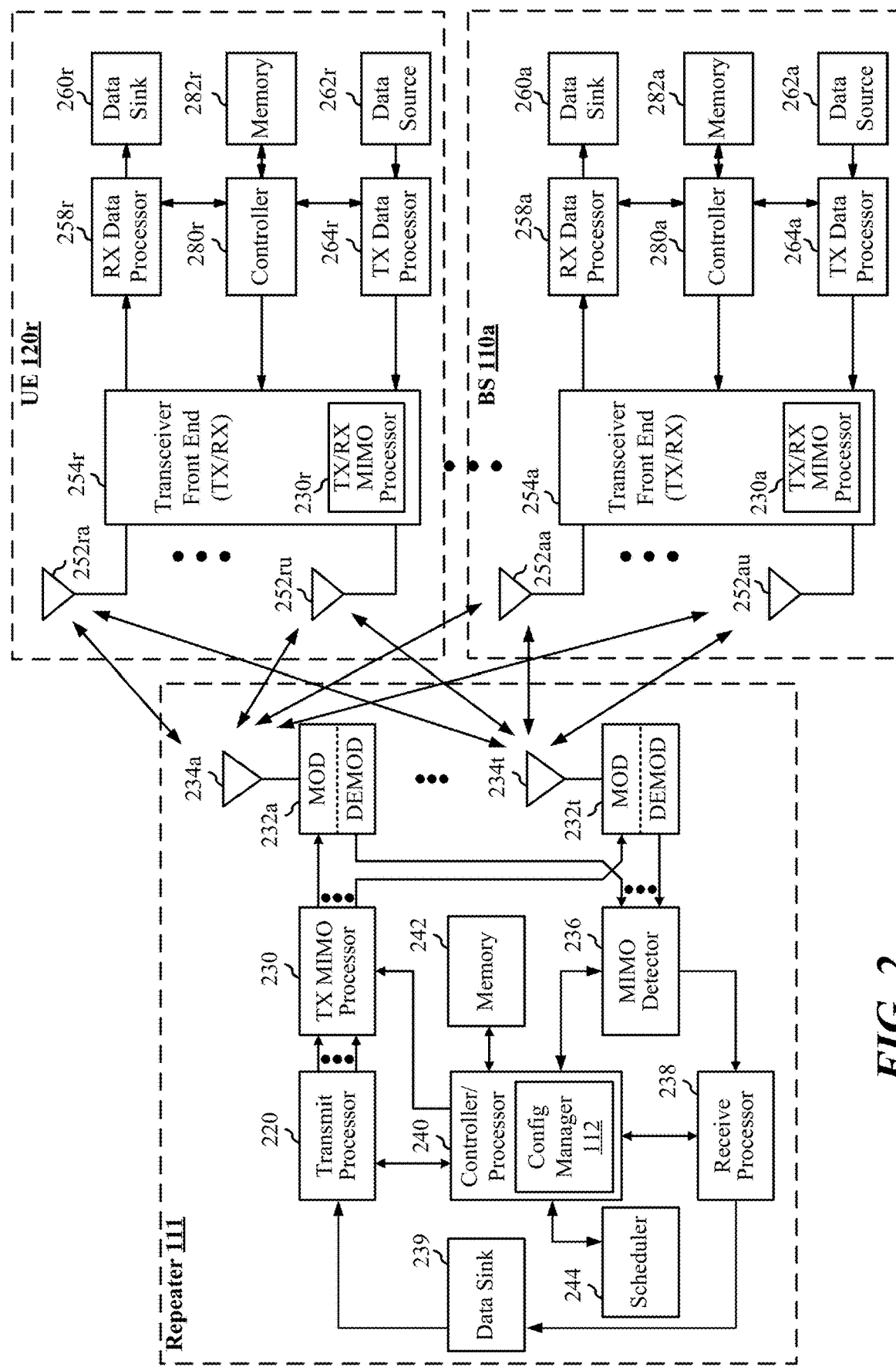
FIG. 2 illustrates example components of a repeater, a base station (BS), and a user equipment (UE) which may be used to implement aspects of the present disclosure.

FIG. 2 illustrates example components of a repeater 111, a BS 110a, and a UE 120r (e.g., in the wireless communication network 100 of FIG. 1), which may be used to implement aspects of the present disclosure. In some aspects of the disclosure, devices such as the BS 110a, repeater 111, and/or UE 120r may be configured for beamforming and/or MIMO technology. The use of such multiple antenna technology enables the wireless communication system to exploit the spatial domain to support spatial multiplexing, beamforming, and transmit diversity.

In an example MIMO system, the repeater 111 includes multiple antennas (e.g., 234a through 234t), and the BS 110a and the UE 120r include multiple antennas (e.g., 252ra through 252ru, and 252aa through 252au) configured to generate a plurality of signal paths between the UE 120r and the BS 110a through the repeater 111.

At the UE 120r and the BS 110a, a transmit processor 264r/264a may receive data from a data source 262r/262a and control information from a controller/processor 280r/280a. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The transmit processor 264r/264a may process (e.g., encode and symbol map) the data and control information to obtain data symbols and control symbols, respectively.

The transmit processor 264r/264a may also generate reference symbols, such as for the primary synchronization signal (PSS), secondary synchronization signal (SSS), and cell-specific reference signal (CRS). A transmit (TX)/receive (RX) multiple-input multiple-output (MIMO) processor 230r/230a may perform spatial processing (e.g., precoding) on the data symbols, the control symbols, and/or the reference symbols, if applicable. The TX MIMO processor may provide output symbol streams to the modulators (MODs) in transceivers 254r/254a, while the RX MIMO processor may provide input symbol streams to the RX data processor 258r/258a. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators of transceivers 254r/254a may be transmitted via the antennas 252ra through 252ru, and 252aa through 252au, respectively.

At the repeater 111, antennas 234a-234t may receive downlink signals from the BS 110a and may provide received signals to the demodulators (DEMODs) 232a-232t, which form part of a transceiver (not shown). Each demodulator 232 may condition (e.g., filter, amplify, downconvert, and digitize) a respective received signal to obtain input samples. Each demodulator may further process the input samples (e.g., for OFDM, etc.) to obtain received symbols. A MIMO detector 236 may obtain received symbols from all the demodulators 232a-232r, perform MIMO detection on the received symbols if applicable, and provide detected symbols.

In some examples, a receive processor 238 may process (e.g., demodulate, deinterleave, and decode) the detected symbols, and provide decoded data to a data sink 239, and provide decoded control information to a controller/processor 240. In this case, a transmit processor 220 may pull the decoded data from the data sink 239 and/or the decoded control information from the controller/processor 240, and process the data for transmission over a physical channel (e.g., an uplink shared channel (PUSCH), an physical uplink control channel (PUCCH), the PDSCH, or the PDCCH).

However, in some examples, the MIMO detector 236 may obtain received symbols from the demodulators 232a-232r, perform MIMO detection on the received symbols if applicable, and provide the detected symbols to the controller/processor 240. In this case, the transmit processor 220 may pull the detected symbols from the controller/processor 240, and process the detected symbols for transmission over the physical channel.

The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a and/or the UE 120r. Accordingly, data received from the UE 120r or the BS 110a may be relayed, or repeated, to the other of the UE 120r or BS 110a via one or more spatially directed beams.

Thus, in one example, uplink signals from the UE 120r may be received by the antennas 234, processed by the modulators 232, detected by a MIMO detector 236 if applicable, and further processed by a receive processor 238 to obtain decoded data and control information sent by the UE 120r. The receive processor 238 may provide the decoded data to a data sink 239 and the decoded control information to the controller/processor 240, or alternatively, the MIMO detector 236 may provide the detected symbols to the controller/processor 240 without decoding by the receive processor 238. The transmit processor 220 may receive the detected symbols from the controller/processor 240, or the decoded data and control information from the data sink 239 and the controller/processor 240. The transmit processor 220 may then generate reference symbols for a reference signal, and the symbols from the transmit processor 264 may be precoded by the TX MIMO processor 266 if applicable, then further processed by the modulators 232a-232t in the transceiver, and transmitted to the BS 110a. A similar process may be performed by the repeater 111 for relaying, or repeating, downlink signals from the BS 110a.

The memories 242, 282r, and 282a may store data and program codes for the repeater 111, BS 110a, and UE 120r, respectively. A scheduler 244 may be configured to provide the repeater 111 with a mechanism for dynamically scheduling an object detection process such that it does not interfere with signaling transmitted/received between the repeater 111 and both of the UE 120r and BS 110a.

Antennas 234, processors 230, 238, 220, and/or controller/processor 240 of the repeater 111 may be used to perform the various techniques and methods described. As shown in FIG. 2, the controller/processor 240 of the repeater 111 has a configuration manager 112 that may be configured for performing a sensing operation, as well as a configuration process. The sensing operation may obtain information about an environment of the repeater. The sensing operation may obtain radar data, LiDAR data, in-band radio frequency (RF) power measurement data, or image data.

As noted, the configuration manager 112 may be configured to perform a configuration process. The configuration process may include receiving control information from a control node for a repeating operation. Based on the control information and the sensor information, the configuration process enables efficient repeating of a wireless signal received from an upstream device towards a downstream device.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As disclosed, in certain aspects, a repeater 111 may utilize one or more object detection techniques to determine proximity and/or location of an object that may cause wireless signal interference. For example, the repeater 111 may utilize one or more of radio detection, image sensing, power measurement, and ranging (radar, LiDAR) frequency bands for object detection, or 5G NR communication bands for object detection. Such techniques allow a repeater 111 to determine a suitable spatial direction for retransmitting signaling. For example, if the repeater 111 is stationary, signal interference may be caused by automobiles, people, etc. If the repeater 111 is mobile, the movement of the repeater 111 may introduce additional objects such as buildings, trees, etc. In either case, object detection may provide the repeater 111 with a basis for determining a suitable spatial direction for retransmission.

Radar is a complementary technology to wireless communication, and can be utilized to enhance a wireless communication experience. Radar uses electromagnetic waveforms to detect objects and determine information such as its relative location and/or distance. Such techniques may be performed by transmitting a radar waveform from a communication device (e.g., the repeater 111 of FIGS. 1 and 2) and receiving the reflection of the waveform off of an object.

For a stationary ranging radar system (e.g., a radar system on the repeater 111), distance (D)=½ the time delay between the transmitted and received radar waveform, times the speed of the radar waveform (which may be approximated as $3 \times 10^8$ m/s or (C)). In certain aspects, transmitters and receivers (e.g., antennas 234, processors 230, 238, 220, and/or controller/processor 240 of the repeater 111 of FIG. 2) can use the same antenna, or groups of antennas (e.g., antennas 234a-234t of FIG. 2), and use circuitry such as a duplexer to control input and output operation. In certain aspects, it is impractical to use single pulse radar systems, as it will be appreciated that for a ten meter target, the time delay is less than ⅒ of a microsecond [$(2*10)/(3*10^8)$=66 nanoseconds]. Thus, in certain aspects, another approach to radar detection is to use a continuous wave (CW) radar waveform.

In certain aspects, unmodulated CW (UM-CW) radar detection systems transmit a radar waveform at a constant frequency and use any change in frequency in the received radar waveform to determine the speed of an object. In certain aspects, UM-CW radar is not used to provide range, as stationary objects do not generate a frequency change in the received radar waveform. UM-CW radar is commonly used in sports, for example to determine the speed of a baseball or a race car.

In certain aspects, to obtain more information, frequency modulated CW (FM-CW) radar may be used. In general, a frequency of the FM-CW signal increases or decreases across a time interval. In certain aspects, different types of frequency modulations may be used, including one or more of linear-frequency modulations (LFM) (e.g., chirp), sawtooth-frequency modulations, triangular-frequency modulations, and/or so forth. In certain aspects, the FM-CW signal can be generated using existing components within the repeater 111 (e.g., antennas 234, processors 230, 238, 220, and/or controller/processor 240 of the repeater 111 of FIG. 2). In certain aspects, the FM-CW signal enables radar-based ranging techniques to be utilized to determine the range to an object. In certain aspects, to achieve a finer range resolution (e.g., on the order of centimeters (cm)) for close-range applications, larger bandwidths can be utilized, such as 1 gigahertz (GHz), 4 GHz, 8 GHz, and so forth. For instance, the FM-CW signal can have a bandwidth of approximately 4 GHz and include frequencies between approximately 26 and 30 GHz. In certain aspects, the finer range resolution improves range accuracy and enables one or more objects to be distinguished in range. In certain aspects, the FM-CW signal can provide an accurate range measurement for a variety of distances based on the bandwidth (e.g., between approximately 4 and 20 cm for a 4 GHz bandwidth). While the FM-CW signal can be used to measure significant ranges, it should be noted that, in certain aspects, the FM-CW signal can measure ranges between approximately 0 and 150 cm. In certain aspects, an amount of time for performing proximity detection can also be relatively short using the FM-CW signal, such as within approximately one microsecond.

Object detection systems may utilize licensed or unlicensed frequency bands for transmitting and receiving radar signals. For example, a 24 GHz band (e.g., 24.0 GHz to 8 GHz) may be used, or alternatively, a 77 GHz band (e.g., 76 GHz to 85 GHz) may be used for relatively longer range radar applications.

Figure 3A:
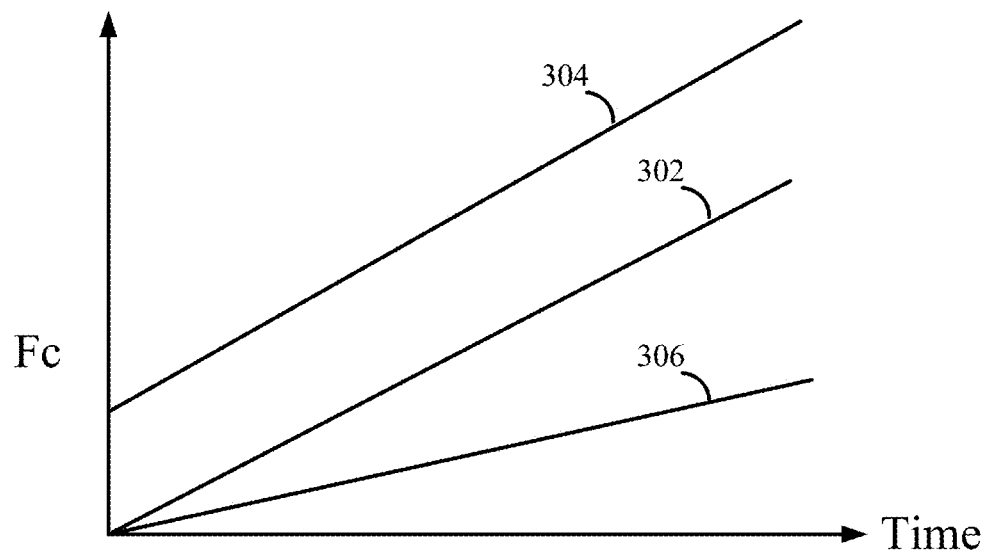
FIG. 3A is a graph illustrating three frequency modulated continuous wave (FM-CW) radar waveforms (or chirps) on a frequency-time scale, in accordance with certain aspects of the present disclosure.

FIG. 3A is a graph illustrating three FM-CW radar waveforms (or chirps) on a frequency-time scale, in accordance with certain aspects of the present disclosure. Chirp 302 has a first slope with its frequency originating at (Fc) of zero (or zero offset). Chirp 304 has the same slope as chirp 302 and a positive (Fc) offset. Chirp 306 has a zero offset and a second slope that is lower than the first slope of chirp 302 (e.g., lower frequency delta for the same time delta).

Figure 3B:
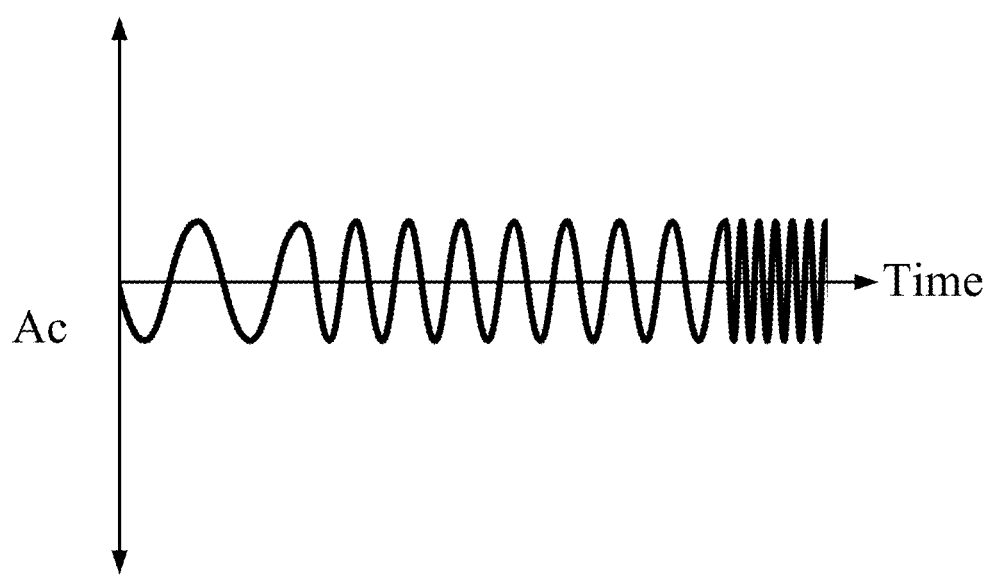
FIG. 3B is a graph illustrating the chirp from FIG. 3A on an amplitude-time scale, in accordance with certain aspects of the present disclosure.

FIG. 3B is a graph illustrating the chirp 302 from FIG. 3A on an amplitude-time scale wherein the amplitude (Ac) oscillations increase in frequency over the chirp time, in accordance with certain aspects of the present disclosure. It will be appreciated that in certain aspects, the phase of the chirp may be controlled to provide a desired phase. When an FM-CW chirp is received, it may experience both a change in frequency and a time delay, and therefore can be used to simultaneously measure the relative range (e.g., using the time delay) and the velocity (e.g., using the frequency change) of an object from the radar detection system.

Figure 4:
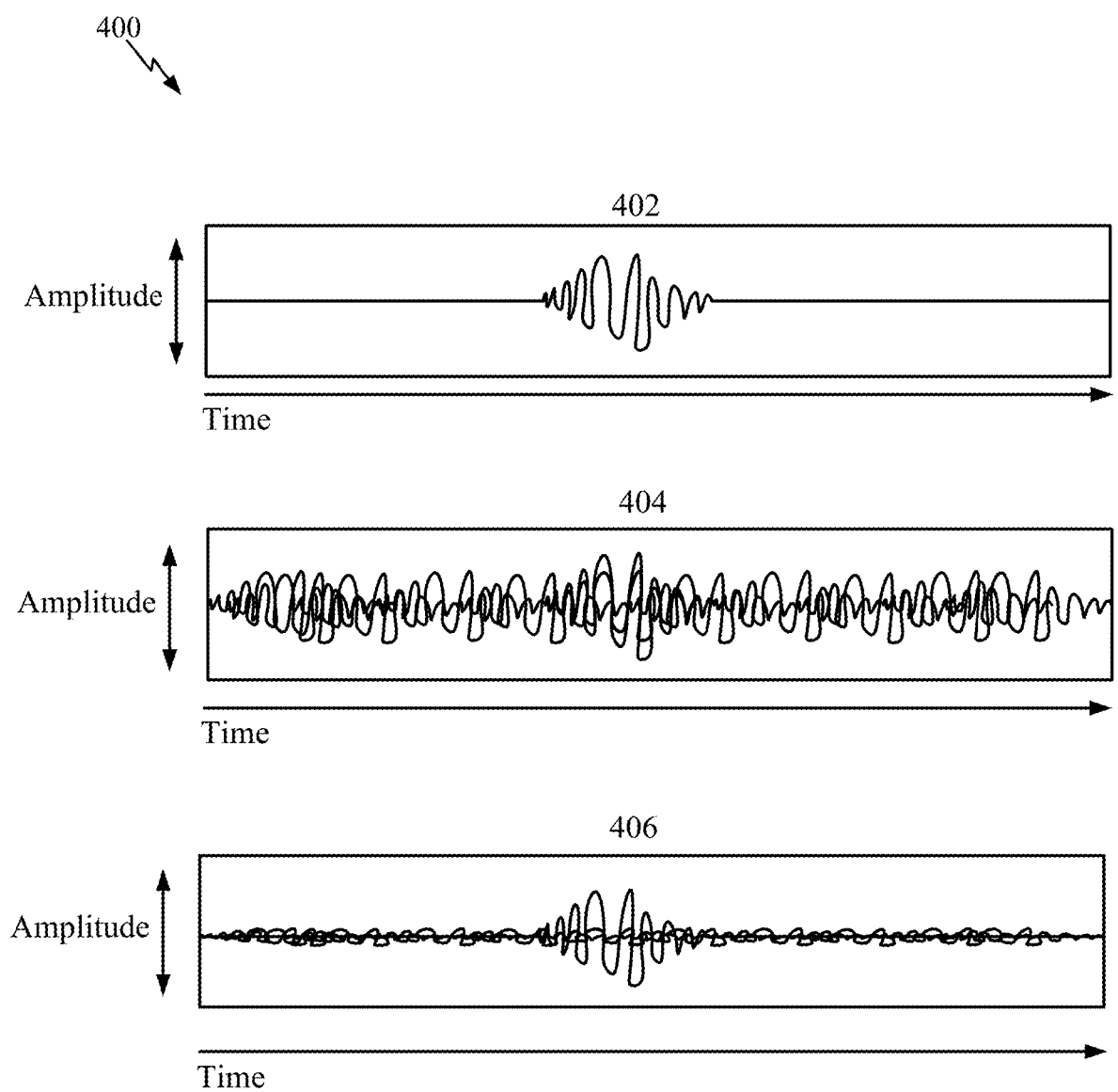
FIG. 4 illustrates three graphs representative of an object detected by one or more radar waveforms, in accordance with certain aspects of the present disclosure.

FIG. 4 shows three graphs 400 representative of an object detected by one or more radar waveforms, in accordance with certain aspects of the present disclosure. Radar waveform 402 depicts detecting an object with a single chirp in an environment free from interference. The signal-to-noise ratio is ideal as the noise is shown as zero. It will be appreciated that environments are rarely free from interference. For example, radar waveform 404 depicts detecting an object with a single chirp in an environment with relatively high interference and/or high powered signaling from other sources. It will be appreciated that the signal-to-noise ratio is poor because the interference is high, making object detection poor. Radar waveform 406 depicts the same high interference environment as with radar waveform 404; however, radar waveform 406 is representative of coherent integration (or time-domain averaging) using a number of chirps (e.g., 64 chirps). It will be appreciated that interference is often random, and thus using a plurality of chirps does not increase the signal of the interference because they do not coherently combine. However, it will be appreciated that a received radar signal incident an object will coherently combine, thereby increasing the signal-to-noise ratio as shown at radar waveform 406. As shown in FIG. 4, the signal-to-noise ratio of signal 406 is better than signal 404.

Further, although certain examples provided apply to radar signal bands, it can be appreciated that the object detection systems disclosed may utilize millimeter wave (mmWave) band(s) (e.g., 10 GHz to 100 GHz) LiDAR, imaging, or other techniques. In certain aspects, the repeater 111 may transmit signaling over spatially directional beams in the mmWave band, and listen to detect a reflection of the transmitted signaling using spatially directed receive beams. As such, the repeater 111 may perform object detection in a way similar to radar proximity detection, but by way of spatially directed beams. In some examples, the repeater 111 may perform object detection through beam-sweeping, wherein the repeater 111 transmits one or more signals over multiple transmit beams, and listens to detect a reflection of the transmitted signaling using spatially directed receive beams corresponding to the multiple transmit beams.

Example of Object Detection and Interference Avoidance

Figure 5:
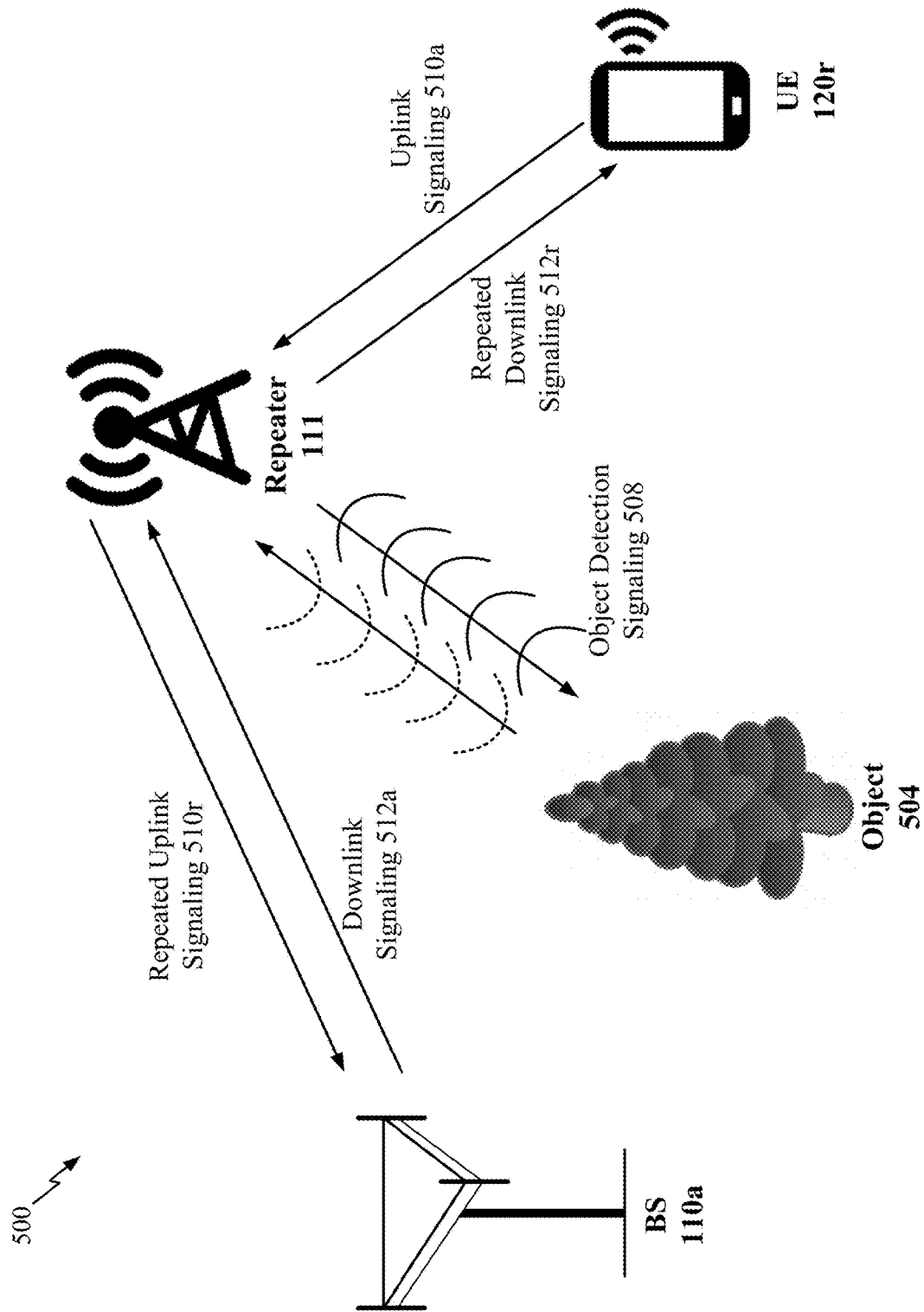
FIG. 5 is a diagram conceptually illustrating a repeater performing an object detection process, in accordance with certain aspects of the present disclosure.

FIG. 5 is a diagram conceptually illustrating a repeater 111 (e.g., the repeater 111 of FIGS. 1 and 2) performing an object detection process over a network 500, in accordance with certain aspects of the present disclosure. In this example, the communication network includes a UE (e.g., user equipment (UE) 120r of FIGS. 1 and 2) and a BS (e.g., BS 110a of FIGS. 1 and 2)) engaged in wireless communication with each other through the repeater 111. For example, the UE 120r may communicate via uplink signaling 510a to the repeater 111, which the repeater 111 may relay to the BS 110a via repeated uplink signaling 510r. Similarly, the BS 110a may communicate via downlink signaling 512a to the repeater 111, which the repeater 111 may then relay to the UE 120r via repeated downlink signaling 512r. In this case, the uplink signaling 510a is configured to provide data or control information to the BS 110a, and the downlink signaling 512a is configured to provide data or control information to the UE 120r.

The repeater 111 may utilize spatially directed beams to communicate the repeated downlink signaling 512r to the UE 120r and the repeated uplink signaling 510r to the BS 110a. In the example of FIG. 5, an object 504 between the UE 120r and BS 110a may impede certain spatially directed beams between the UE 120r and the repeater 111, and between the BS 110a and the repeater 111. Accordingly, the repeater 111 may be configured to determine a beam direction for retransmitting a signal based on object detection. As described, the repeater 111 is configured to perform object detection using object detection signaling 508 wirelessly communicated over one or more of a mmWave band or a radar band.

In one example, the repeater 111 may receive uplink signaling 510a from the UE 120r, and determine a beam direction for retransmitting the uplink signaling 510a to the BS 110a. In certain aspects, the beam direction for retransmission is determined based on an object detection process performed by the repeater 111. The object detection process may include one or more of the techniques discussed. For example, the repeater 111 may transmit object detection signals 508 over a directional beam of a set of directional beams generated by the repeater 111.

The repeater 111 may then listen for a reflection of the object detection signals 508, and determine a location of an object 504 relative to the repeater 111 based on a duration of time between: (i) receiving a reflection of one or more of the object detection signals 508, and (ii) transmission of the one or more of the object detection signals 508. The repeater 111 may also determine a proximity (e.g., a location and/or a distance) of the object 504 relative to the repeater 111. Based on the determined proximity of the object 504, the repeater 111 may determine which spatial direction(s) of the directional beams provide suitable (e.g., the best) communication linking between the repeater 111 and the UE 120r, and between the repeater 111 and the BS 110a. That is, the repeater 111 may determine which spatial direction(s) are not blocked by, or subject to interference from, the object 504. Thus, determining a beam direction for transmitting the repeated uplink signaling 510r may include a determination by the repeater 111 that a beam direction is directed away from the determined location of the object.

In some aspects, the uplink/downlink signaling 510a/512a and repeated uplink/downlink signaling 510r/512r are communicated over a first frequency band, and the object detection signals 508 for the object detection process are transmitted over a second frequency band separate from the first frequency band. For example, the uplink signaling 510a and downlink signaling 512a, and the corresponding repeated uplink signaling 510r and repeated downlink signaling 512r, may be communicated over a 5G frequency band (e.g., 28 GHz), whereas the object detection signals 508 transmitted for the object detection process may be communicated over a radar band (e.g., 77 GHz).

In certain such aspects, the repeater 111 may utilize the common digital hardware (e.g., transmit processor 220 of FIG. 2) to generate both the repeated uplink/downlink signaling and the object detection signals 508 for object detection. However, it should be noted that, in certain such aspects, separate antenna elements may be used for the repeated uplink/downlink signaling and the object detection signals 508. For example, if the repeater 111 simultaneously transmits a repeated uplink signal 510r, while also transmitting object detection signaling 508, the transmit processor 220 may be configured to generate both signals; however, the repeater 111 may use a first antenna element (e.g., antenna 234a) to transmit the repeated uplink signal 510r, and a second antenna element (e.g., antenna 232t) to transmit the object detection signaling 508. In certain aspects, analog signal processors (e.g., TX MIMO processor 230) may be used for transmitting the repeated uplink/downlink signaling 510r/512r that are separate from the analog signal processors used for transmitting and receiving the object detection signaling 508.

In certain aspects, the uplink signaling 510a, downlink signaling 512a, repeated uplink signaling 510r, repeated downlink signaling 512r, and object detection signals 508 may all be communicated over a 5G band (e.g., 28 GHz). In certain such aspects, the repeater 111 may utilize common digital hardware to generate both the repeated uplink/downlink signaling and the object detection signals 508 for object detection. In certain such aspects, the repeater 111 may also utilize the same antenna elements to transmit both the repeated uplink/downlink signaling and the object detection signals 508. For example, if the repeater 111 transmits a repeated uplink signal 510r using a first antenna element (e.g., antenna 234a), the repeater 111 may also signal for object detection using the same first antenna element. However, in certain such aspects, the repeater 111 may utilize dynamic, or aperiodic timing (e.g., via scheduler 244 of FIG. 2) to time different transmit/receive intervals so that the repeater 111 does not interfere with cell communications when it performs the object detection process. That is, the uplink/downlink signaling 510a/512a and/or repeated uplink/downlink signaling 510r/512r may occur during a first time period, whereas transmitting and receiving the object detection signaling 508 may occur during a second time period. In certain such aspects, the repeater 111 may be configured to determine transmission and reception scheduling of the BS 110a and the UE 120r, and may schedule an object detection process when the BS 110a and the UE 120 are not communicating via the repeater 111.

In certain aspects, the repeater 111 may be configured to dynamically, or aperiodically, perform the object detection process based on a determination of whether ambient signaling (e.g., the uplink/downlink signaling 510a/512a or other signaling within range of the repeater 111) is greater than or less than a threshold power level. For example, the repeater 111 may be configured to determine whether a power level of signaling being transmitted over the first frequency band is below a threshold power level. If the power level is below the threshold power level, the repeater 111 may perform the object detection process. If the power level is greater than the threshold power level, then the repeater 111 may refrain from performing the object detection process. As such, the repeater 111 may only perform the object detection process when the frequency band it is using for object detection has relatively less potential for interference. Accordingly, the repeater 111 may avoid interfering with neighboring device signaling.

In some aspects, the repeater 111 may be configured to periodically perform an object detection process. For example, the repeater 111 may be configured to perform the object detection process every 10 ms. In such aspects, if the repeater 111 determines that the object detection process will occur at the same time as the uplink/downlink signaling 510a/512a and/or repeated uplink/downlink signaling 510r/512r, the repeater 111 may utilize radar or LiDAR signaling to avoid interference with communications between the repeater 111 and the UE 120r and the BS 110a. Alternatively, in certain aspects, if the repeater 111 determines that the object detection process will not occur at the same time as the uplink/downlink signaling 510a/512a and/or repeated uplink/downlink signaling 510r/512r, the repeater 111 may utilize a same signaling band as the uplink/downlink signaling 510a/512a and/or repeated uplink/downlink signaling 510r/512r.

Figure 6:
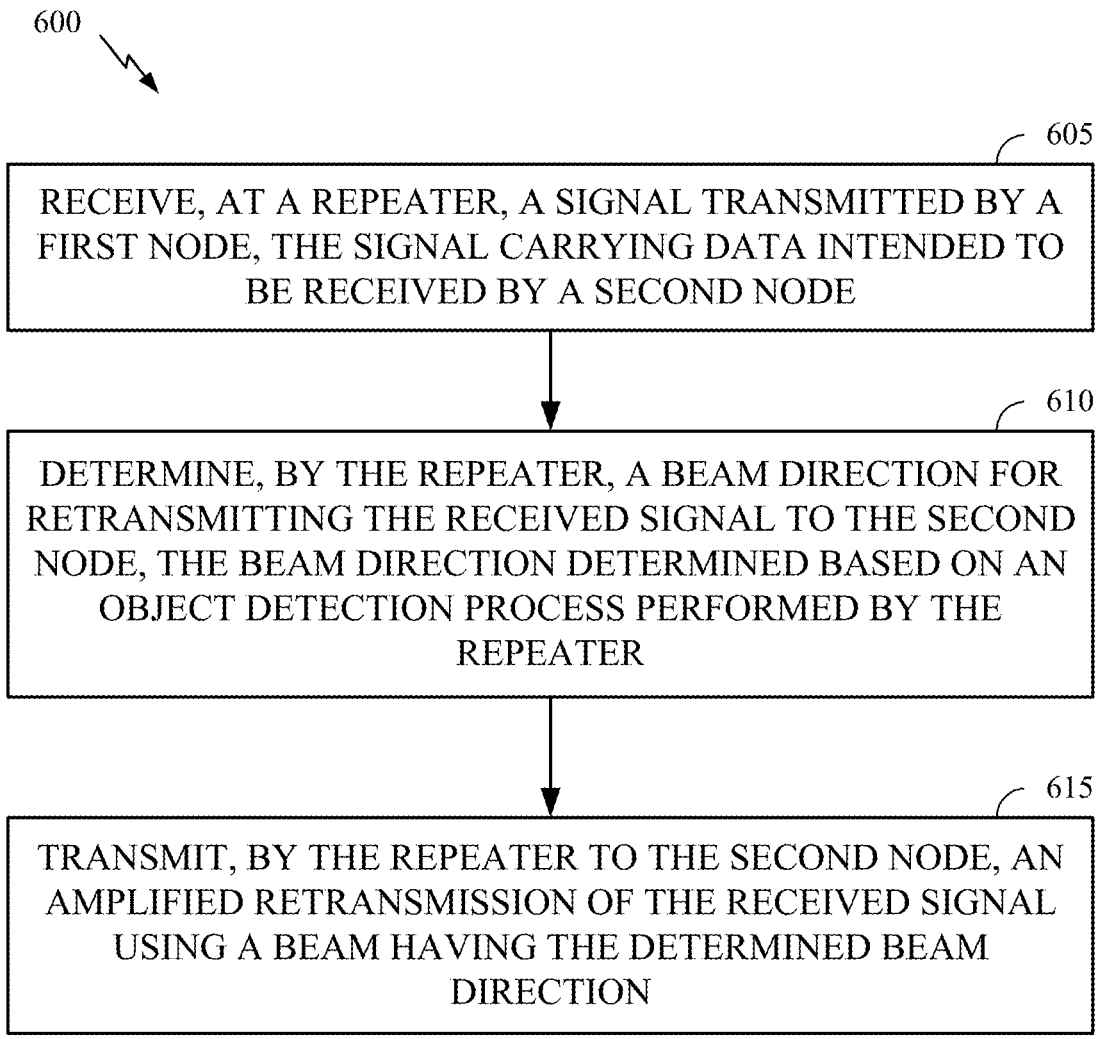
FIG. 6 is a flow diagram illustrating example operations for determining a spatial direction for transmission of a repeated signal based on spatial sensing and detection of interference, in accordance with certain aspects of the present disclosure.

FIG. 6 is a flow diagram illustrating example operations 600 for determining a spatial direction for transmission of a repeated signal based on spatial sensing and detection of interference, in accordance with certain aspects of the present disclosure. In some examples, the operations 600 may be performed by a repeater (e.g., repeater 111 of FIGS. 1 and 2) via a general-purpose processor, a controller/processor 240 as described above and illustrated in FIG. 2, or any suitable means for carrying out the described functions.

At a first step 605, the operations 600 begin by receiving, at a repeater, a signal transmitted by a first node, the signal carrying data intended to be received by a second node.

At a second step 610, the operations 600 may proceed by determining, by the repeater, a beam direction for retransmitting the received signal to the second node, the beam direction determined based on an object detection process performed by the repeater.

At a third step 615, the operations 600 may proceed by transmitting, by the repeater to the second node, an amplified retransmission of the received signal using a beam having the determined beam direction.

According to certain aspects, the object detection process comprises transmitting each of a set of signals over each of a set of directional beams, the signals generated by the repeater; and determining a location of an object relative to the repeater based on a duration of time between: (i)

receiving a reflection of one or more of the plurality of signals, and (ii) transmission of the one or more of the signals.

According to certain aspects, determining the beam direction for retransmitting the received signal further comprises determining that the beam direction is directed away from the determined location of the object.

According to certain aspects, the received signal and the amplified retransmission of the received signal are communicated over a first frequency band, and wherein the signals are transmitted over a second frequency band separate from the first frequency band.

According to certain aspects, the operations 600 include periodically performing the object detection process.

According to certain aspects, the operations 600 include generating, by a digital signal processor of the repeater, the amplified retransmission of the received signal and the signals; transmitting, by a first analog signal processor of the repeater, the amplified retransmission of the received signal; and transmitting, by a second analog signal processor of the repeater, the signals.

According to certain aspects, the received signal and the amplified retransmission of the received signal are communicated over a first time period, and wherein the signals are transmitted over a second time period separate from the first time period.

According to certain aspects, the received signal, the amplified retransmission of the received signal, and the signals are transmitted over a first frequency band.

According to certain aspects, the operations 600 include dynamically performing the object detection process, comprising: determining whether a power level of signaling being transmitted over the first frequency band is below a threshold power level; when the power level is below the threshold power level, performing the object detection process; and when the power level is greater than the threshold power level, refraining from performing the object detection process.

According to certain aspects, the operations 600 include generating, by a digital signal processor of the repeater, the amplified retransmission of the received signal and the signals; and transmitting, by an analog signal processor of the repeater, the amplified retransmission of the received signal and the plurality of signals.

Figure 7:
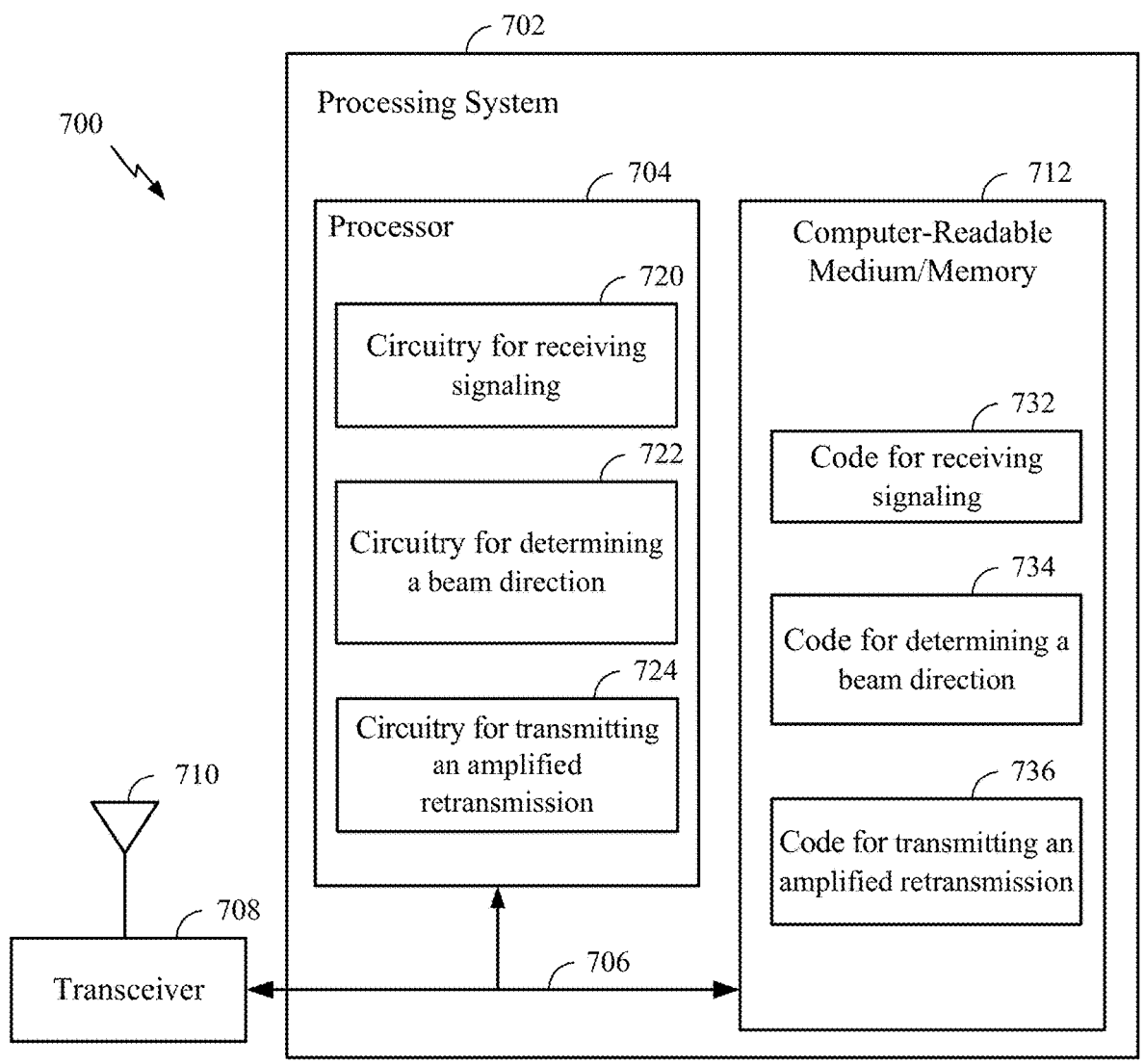
FIG. 7 illustrates a communications device that may include various components (e.g., corresponding to means-plus-function components) configured to perform operations for the techniques disclosed herein, such as the operations illustrated in FIG. 6.

FIG. 7 illustrates a communications device 700 that may include various components (e.g., corresponding to means-plus-function components) configured to perform operations for the techniques disclosed, such as the operations illustrated in FIG. 6. The communications device 700 includes a processing system 702 coupled to a transceiver 708. The transceiver 708 is configured to transmit and receive signals for the communications device 700 via an antenna 710, such as the various signals as described. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 6, or other operations for performing the various techniques discussed for spatial sensing and avoiding interference for retransmitting a wireless signal.

In certain aspects, computer-readable medium/memory 712 stores code 732 for a receiving a signal transmitted by a first node, the signal carrying data intended to be received by a second node; code 734 for determining a beam direction for retransmitting the received signal to the second node, the beam direction determined based on an object detection process performed by the repeater; and code 736 for transmitting an amplified retransmission of the received signal using a beam having the determined beam direction.

In certain aspects, the processor 704 has circuitry configured to implement the code stored in the computer-readable medium/memory 712. The processor 704 includes circuitry 720 for receiving a signal transmitted by a first node, the signal carrying data intended to be received by a second node; circuitry 722 for determining a beam direction for retransmitting the received signal to the second node, the beam direction determined based on an object detection process performed by the repeater; and circuitry 724 for transmitting an amplified retransmission of the received signal using a beam having the determined beam direction.

Utilization of Sensor Information at Repeaters

As described above, repeaters may be deployed in a system to extend the coverage of the network nodes and/or provide spatial diversity, resulting in increased network reliability and/or network capacity. Blockage is an issue, however, for higher frequencies, such as mmWave frequencies. Many cells may be deployed in these higher frequency networks, including small cells, pico cells, femto cells, etc., to address the blockage issues. Such cells may be an expensive solution for addressing blockage. Repeaters may be a less expensive alternative for addressing blockage.

Conventional systems may have two types of repeaters. A first type of repeater may be a traditional repeater with a fixed or semi-fixed configuration. The traditional repeater may also be referred to as a non-configurable repeater. A second type of repeater may be a smart repeater with configurable properties. In some examples, the configurable properties may be dynamically configured. One motivation for smart repeaters is beam configuration. The smart repeater may be an example of a node. Smart repeaters may be further categorized into two sub-types. A first sub-type may be an autonomously smart sub-type. The autonomously smart sub-type repeater may learn and reconfigure its properties as needed. A second sub-type may be a network-controlled smart sub-type. The network-controlled smart sub-type may be controlled remotely by a control-node. In order for the second sub-type to work, a control interface is deployed between the node and the control node. Repeaters may be configured with power settings, transmit/receive (TX/RX) beams (e.g., beam management), uplink/downlink (UL/DL) forwarding direction (e.g., time division duplexing (TDD) patterns that may identify uplink slots and downlink slots), on/off patterns, bandwidth configurations, and/or timing adjustments. As an example, the power settings may indicate amplification levels to reduce interference and/or save power.

According to aspects of the present disclosure, the sensor information may improve beam configurations. Types of sensor information may include radar, LiDAR, radio frequency (RF) (in-band) power measurements, and/or visual features (e.g., images). The beam configurations may be updated based on the sensor information alone, or in combination with control information received from a control node. In aspects of the present disclosure, the available sensor information may be used for fronthaul beams and service-side beams.

Fronthaul beams are examples of beams between a donor node (e.g., gNB, integrated access backhaul (IAB)-node, relay, repeater, and/or reflector) and the repeater. The fronthaul beam may be a fixed beam due to the lack of mobility of the repeater and the donor node. According to aspects of the present disclosure, a repeater may use the sensor information and/or control information to locate a donor node, including a distance and direction of the donor node relative to the repeater. Once located, the repeater may transmit a fronthaul beam towards the direction of the donor node. The fronthaul beam can be a very narrow beam configured towards the donor node. In some examples, the fronthaul beam may be formed based on the sensor information and/or based on the control information received from the control node.

A service-side beam may be an example of another type of beam. Service-side beams are more dynamic than fronthaul beams to account for a UE's mobility. Thus, for service-side beams, it may be desirable to detect more relevant directions as opposed to irrelevant directions. According to aspects of the present disclosure, the repeater may locate possible coverage holes based on the sensor information and/or control information. Coverage holes are examples of areas where a coverage level satisfies a coverage condition, such as the coverage level being less than a threshold value. The sensor information may detect a blockage, such as foliage, between the donor node and a nearby area. Based on a detected coverage hole, the repeater may form a beam towards the coverage hole. In such an example, the signal is transmitted behind the blocker. The beam may be formed based on the sensor information and/or based on the control information received from the control node. For example, the repeater may receive control information providing the location information or some related assistance information. The repeater may account for this information when forming a beam. Alternatively, the control node may analyze the sensor information and determine the beam configuration, which may be forwarded to the repeater.

According to aspects of the present disclosure, the sensor information may improve coverage from an outdoor environment to an indoor environment. For example, coverage inside a building from a signal source outside the building may be improved. In these aspects, the repeater locates a window, or another type of opening on a facade of a building, by using the sensor information and/or control information. The repeater may then generate a service-side beam towards the opening. The beam may be formed based on the sensor information and/or based on the control information received from the control node.

According to further aspects of the present disclosure, the sensor information may identify locations that satisfy certain criteria. For example, the sensor information may identify high-demand locations, or locations having a service demand above a threshold value. These locations may include storefronts, bus stops, or metro station entrances, for example. The repeater may form a service-side beam towards these locations. The beam may be formed based on the sensor information and/or based on the control information received from the control node.

According to still further aspects of the present disclosure, the sensor information may be used to determine a geometry of an environment. For example, the geometry may include a distance to blockers or buildings in different directions. Based on this information, the repeater may determine the distance to be covered in each direction, and create a beam accordingly. An example is a city street corner. The beam may be formed based on the sensor information and/or based on the control information received from the control node.

Figure 8:
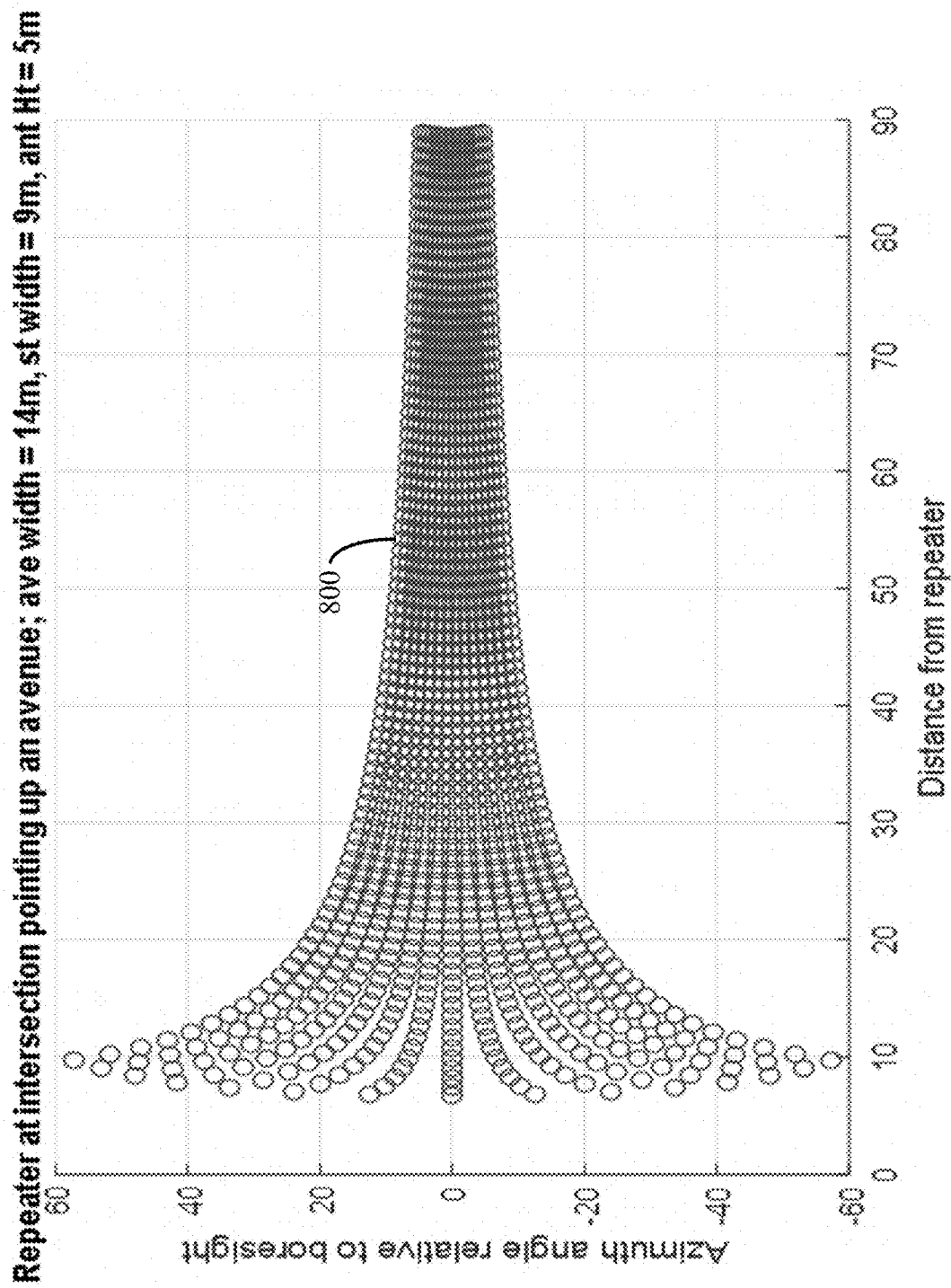
FIG. 8 is a graph showing a repeater azimuth angle relative to boresight and distance from the repeater, according to aspects of the present disclosure.

FIG. 8 is a graph showing a repeater azimuth angle relative to boresight and distance from the repeater, according to aspects of the present disclosure. In FIG. 8, a narrow beam 800 is seen. In this example, the repeater is located at an intersection, with the beam 800 directed down one of the streets. The side lobes of the beam cover a closer area along the intersecting street. Because the pathloss is lower near the repeater, the side lobes are able to cover UEs in the smaller area, even though the side lobe power is lower.

In some aspects of the present disclosure, the repeater itself may be equipped with a processor that can analyze the collected sensor information, extract the features, and determine configurations accordingly.

In other aspects of the present disclosure, the repeater receives some assistance from a control node. The repeater may share the collected information with a control node. The control node may be a network node (e.g., gNB) or a node in a server that may be reached through an Internet protocol (IP) network, for example.

In some implementations, the control node may collect information from multiple repeaters, UEs, and/or network nodes and determine the appropriate configuration for the repeater. The control node may then provide the configuration to the repeater. As described above, the configuration may be an ON-OFF configuration, beamforming configuration, power configuration, time division duplex (TDD) pattern, timing adjustment configuration, and/or a bandwidth configuration. In some examples, the control node may collect information for network nodes (including repeaters) and share with information with them, including street level maps, aerial maps, etc.

Figure 9:
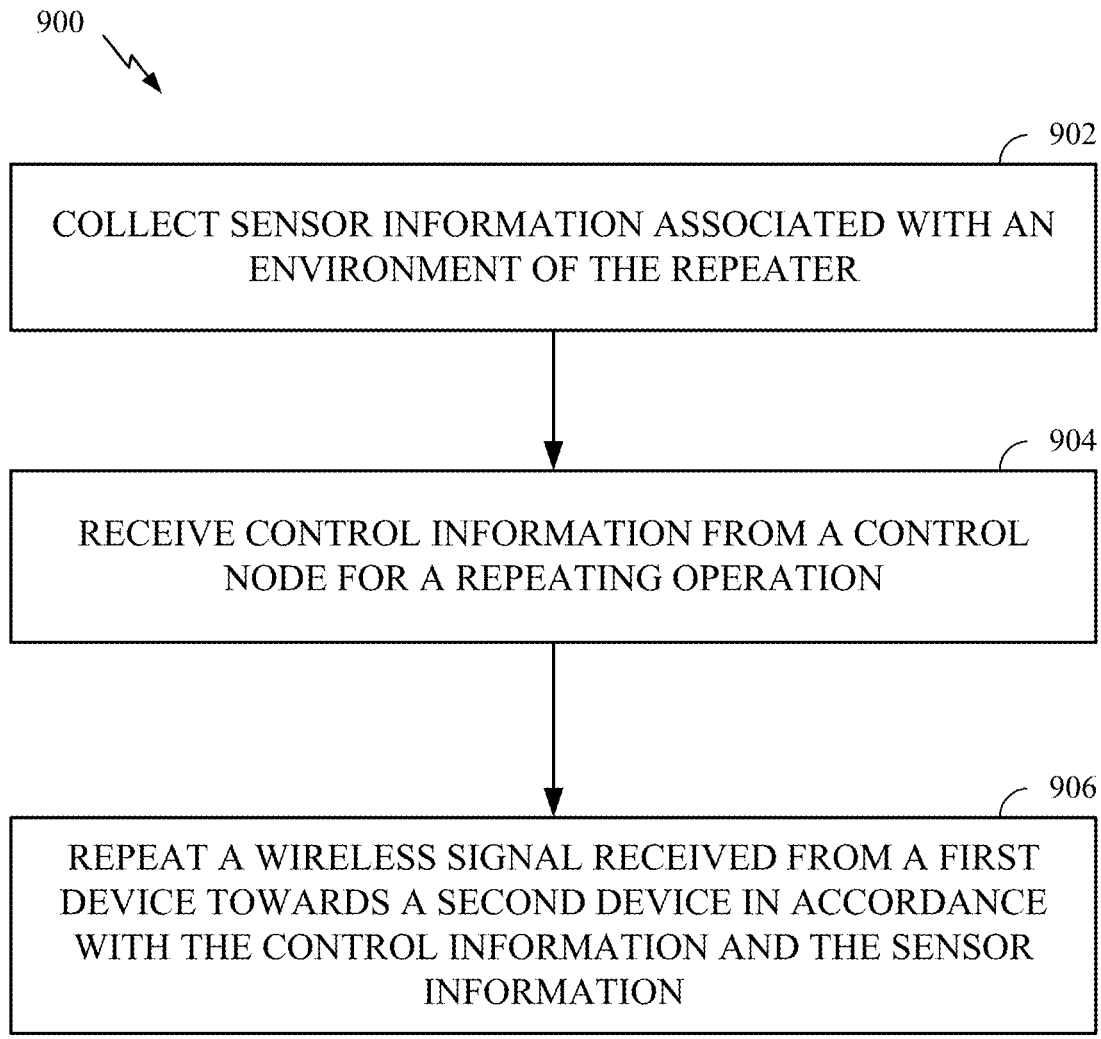
FIG. 9 is a flow diagram illustrating example operations for a repeater, in accordance with certain aspects of the present disclosure.

FIG. 9 is a flow diagram illustrating example operations 900 performed, for example, by a repeater, in accordance with various aspects of the present disclosure. The example process 900 is an example of an improved use of sensor information during wireless communication by a repeater. The operations of the process 900 may be implemented by the repeater 111 shown in FIG. 2, for example.

At block 902, the repeater collects sensor information associated with an environment of the repeater. For example, the repeater (e.g., using the antenna 234, demodulator 232, MIMO detector 236, receiver processor 238, controller/processor 240, configuration manager 112, memory 242, and/or the like) may collect the sensor information. The sensor information may be radar data, LiDAR data, radio frequency (RF) power measurement data, and/or image data, for example.

At block 904, the repeater receives control information from a control node for a repeating operation. For example, the repeater (e.g., using the antenna 234, demodulator 232, MIMO detector 236, receive processor 238, controller/processor 240, configuration manager 112, memory 242, and/or the like) may receive the control information. The control information may be a map of the environment. In other examples, the control information may be a repeater configuration including an on/off state, a beam forming configuration, a power configuration, a time division duplexing (TDD) pattern, a bandwidth configuration, and/or a timing adjustment configuration. The control information may help indicate a location of a donor node, a low coverage area, an opening in a building or a high service demand area. The control information may also indicate a geometry of an environment of the repeater.

At block 906, the repeater repeats a wireless signal received from a first device towards a second device in accordance with the control information and the sensor information. For example, the repeater (e.g., using the transmit processor 220, TX MIMO processor 230, modulator 232, antenna 234, controller/processor 240, memory 242, and/or the like) may repeat the wireless signal as a fronthaul beam directed towards the donor node. In other examples, the repeater may generate a service-side beam directed towards a low coverage area, a building opening, or an area with a high service demand. In still other examples, the repeater may generate a service-side beam based on a geometry of the environment.

Figure 10:
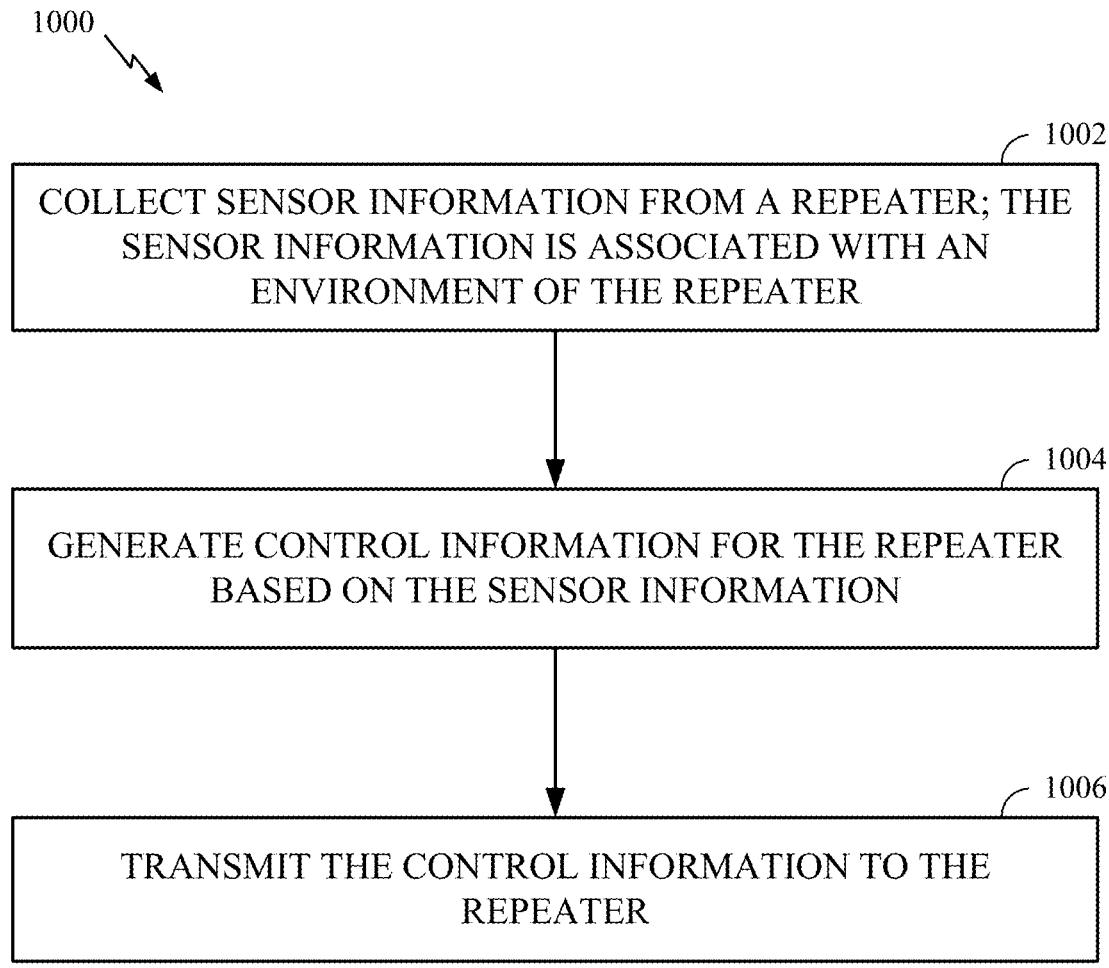
FIG. 10 is a flow diagram illustrating example operations for a control node, in accordance with certain aspects of the present disclosure.

FIG. 10 is a flow diagram illustrating example operations 1000 performed, for example, by a control node, in accordance with various aspects of the present disclosure. The example process 1000 is an example of an improved method of wireless communication by a control node. The operations of the process 1000 may be implemented by the base station 110 of FIG. 2, for example.

At block 1002, the control node collects sensor information from a repeater. The sensor information is associated with an environment of the repeater. For example, the control node (e.g., using the antenna 252, transceiver 254, MIMO processor 230, receive data processor 258, controller 280, memory 282, and/or the like) may collect sensor information, such as radar data, LiDAR data, radio frequency (RF) power measurement data, and/or image data. The collecting may be from additional devices.

At block 1004, the control node generates control information for the repeater based on the sensor information. For example, the control node (e.g., using the controller 280, memory 282, and/or the like) may generate control information. The control information may be a map of the environment. In other examples, the control information may be a repeater configuration including an on/off state, a beam forming configuration, a power configuration, a time division duplexing (TDD) pattern, a bandwidth configuration, and/or a timing adjustment configuration. The control information may help indicate a location of a donor node, a low coverage area, an opening in a building or a high service demand area. The control information may also indicate a geometry of an environment of the repeater.

At block 1006, the control node transmits the control information to the repeater. For example, the control node (e.g., using the antenna 252, transceiver 254, MIMO processor 230, transmit data processor 264, controller 280, memory 282, and/or the like) may transmit the control information.

Implementation examples are described in the following numbered clauses.

1. A method of wireless communication by a repeater, comprising:
   collecting sensor information associated with an environment of the repeater;
   receiving control information from a control node for a repeating operation; and
   repeating a wireless signal received from a first device towards a second device in accordance with the control information and the sensor information.
2. The method of clause 1, in which the sensor information comprises at least one of radar data, LiDAR data, radio frequency (RF) power measurement data, or image data.
3. The method of clause 1 or 2, further comprising transmitting the sensor information to the control node, the control information comprising a configuration based on the sensor information.
4. The method of any of the preceding clauses, in which the configuration is based on additional sensor information received from a plurality of devices.
5. The method of any of the preceding clauses, in which the control information comprises a map of the environment.
6. The method of any of the preceding clauses, in which the control information comprises a repeater configuration including at least one of an on/off state, a beam forming configuration, a power configuration, a time division duplexing (TDD) pattern, a bandwidth configuration, or a timing adjustment configuration.
7. The method of any of the preceding clauses, further comprising:
   locating a donor node based on at least one of the sensor information or the control information; and
   generating a fronthaul beam directed towards the donor node.
8. The method of any of the preceding clauses, in which at least one of the control information and the sensor information indicates an area with a donor node coverage level below a threshold value, the method further comprising generating a service-side beam directed towards the area.
9. The method of any of the preceding clauses, in which at least one of the control information and the sensor information indicates an opening on a building facade; the method further comprising generating a service-side beam directed towards the opening.
10. The method of any of the preceding clauses, in which at least one of the control information and the sensor information indicates an area with a service demand above a threshold value; the method further comprising generating a service-side beam directed towards the area.
11. The method of any of the preceding clauses, in which at least one of the control information and the sensor information indicates a geometry of the environment; the method further comprising generating a service-side beam based on the geometry.
12. A method of wireless communication by a control node, comprising:
    collecting sensor information from a repeater, the sensor information associated with an environment of the repeater;
    generating control information for the repeater based on the sensor information; and
    transmitting the control information to the repeater.
13. The method of clause 12, in which the sensor information comprises at least one of radar data, LiDAR data, radio frequency (RF) power measurement data, image data a bandwidth configuration, or a timing adjustment configuration.
14. The method of clause 12 or 13, further comprising collecting additional sensor information from an additional device, the additional sensor information associated with an environment of the additional device, the method further comprising generating the control information for the repeater based on the additional sensor information.
15. The method of any of the clauses 12-14, in which the control information comprises a map of the environment.
16. The method of any of the clauses 12-15, in which the control information comprises a repeater configuration including at least one of an on/off state, a beam forming configuration, a power configuration, or a time division duplexing (TDD) pattern.
17. The method of any of the clauses 12-16, further comprising locating a donor node based on the sensor information, the control information comprising a configuration for generating a fronthaul beam directed towards the donor node.

18. The method of any of the clauses 12-17, in which the control information indicates an area with a donor node coverage level below a threshold value, or beam information for the repeater to generate a service-side beam directed towards the area.
19. The method of any of the clauses 12-18, in which the control information indicates an opening on a building facade, or beam information for the repeater to generate a service-side beam directed towards the opening.
20. The method of any of the clauses 12-19, in which the control information indicates an area with a service demand above a threshold value, or beam information for the repeater to generate a service-side beam directed towards the area.
21. The method of any of the clauses 12-20, in which the control information indicates a geometry of the environment, or beam information for the repeater to generate a service-side beam based on the geometry.
22. An apparatus for wireless communication by a repeater, comprising:
   a memory; and
   at least one processor coupled to the memory, the at least one processor configured:
   to collect sensor information associated with an environment of the repeater;
   to receive control information from a control node for a repeating operation; and
   to repeat a wireless signal received from a first device towards a second device in accordance with the control information and the sensor information.
23. The apparatus of clause 22, in which the sensor information comprises at least one of radar data, LiDAR data, radio frequency (RF) power measurement data, or image data.
24. The apparatus of clause 22 or 23, in which the at least one processor is further configured to transmit the sensor information to the control node, the control information comprising a configuration based on the sensor information.
25. The apparatus of any of the clauses 22-24, in which the configuration is based on additional sensor information received from a plurality of devices.
26. The apparatus of any of the clauses 22-25, in which the control information comprises a map of the environment.
27. The apparatus of any of the clauses 22-26, in which the control information comprises a repeater configuration including at least one of an on/off state, a beam forming configuration, a power configuration, a time division duplexing (TDD) pattern, a bandwidth configuration, or a timing adjustment configuration.
28. The apparatus of any of the clauses 22-27, in which the at least one processor is further configured:
   to locate a donor node based on at least one of the sensor information or the control information; and
   to generate a fronthaul beam directed towards the donor node.
29. The apparatus of any of the clauses 22-28, in which at least one of the control information and the sensor information indicates an area with a donor node coverage level below a threshold value; the at least one processor further configured to generate a service-side beam directed towards the area.
30. The apparatus of any of the clauses 22-29, in which at least one of the control information and the sensor information indicates an opening on a building facade; the at least one processor further configured to generating a service-side beam directed towards the opening.

Additional Considerations

The techniques described may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, customer premises equipment (CPE), or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of wireless communication by a configurable repeater, comprising:
    collecting sensor information associated with an environment of the repeater;
    receiving control information from a control node for a repeating operation; and
    repeating a wireless signal received from a first device towards a second device in accordance with the control information and the sensor information, the wireless signal transmitted via a beam configuration that is dynamically based on the sensor information.

2. The method of claim 1, in which the sensor information comprises at least one of radar data, LiDAR data, radio frequency (RF) power measurement data, or image data.

3. The method of claim 1, further comprising transmitting the sensor information to the control node, the control information comprising a configuration based on the sensor information.

4. The method of claim 3, in which the configuration is based on additional sensor information received from a plurality of devices.

5. The method of claim 1, in which the control information comprises a map of the environment.

6. The method of claim 1, in which the control information comprises a repeater configuration including at least one of an on/off state, a beam forming configuration, a power configuration, a time division duplexing (TDD) pattern, a bandwidth configuration, or a timing adjustment configuration.

7. The method of claim 1, further comprising:
    locating a donor node based on at least one of the sensor information or the control information; and
    the beam configuration comprising a fronthaul beam directed towards the donor node.

8. The method of claim 1, in which at least one of the control information and the sensor information indicates an area with a donor node coverage level below a threshold value, the beam configuration comprising a service-side beam directed towards the area.

9. The method of claim 1, in which at least one of the control information and the sensor information indicates an opening on a building facade; the beam configuration comprising a service-side beam directed towards the opening.

10. The method of claim 1, in which at least one of the control information and the sensor information indicates an area with a service demand above a threshold value; the beam configuration comprising a service-side beam directed towards the area.

11. The method of claim 1, in which at least one of the control information and the sensor information indicates a geometry of the environment; the beam configuration comprising a service-side beam based on the geometry.

12. A method of wireless communication by a control node, comprising:
    collecting sensor information from a configurable repeater, the sensor information associated with an environment of the repeater;
    generating control information for the repeater dynamically based on the sensor information; and
    transmitting the control information to the repeater.

13. The method of claim 12, in which the sensor information comprises at least one of radar data, LiDAR data, radio frequency (RF) power measurement data, image data a bandwidth configuration, or a timing adjustment configuration.

14. The method of claim 12, further comprising collecting additional sensor information from an additional device, the additional sensor information associated with an environment of the additional device, the method further comprising generating the control information for the repeater based on the additional sensor information.

15. The method of claim 12, in which the control information comprises a map of the environment.

16. The method of claim 12, in which the control information comprises a repeater configuration including at least one of an on/off state, a beam forming configuration, a power configuration, or a time division duplexing (TDD) pattern.

17. The method of claim 12, further comprising locating a donor node based on the sensor information, the control information comprising a configuration for generating a fronthaul beam directed towards the donor node.

18. The method of claim 12, in which the control information indicates an area with a donor node coverage level below a threshold value, or beam information for the repeater to generate a service-side beam directed towards the area.

19. The method of claim 12, in which the control information indicates an opening on a building facade, or beam information for the repeater to generate a service-side beam directed towards the opening.

20. The method of claim 12, in which the control information indicates an area with a service demand above a threshold value, or beam information for the repeater to generate a service-side beam directed towards the area.

21. The method of claim 12, in which the control information indicates a geometry of the environment, or beam information for the repeater to generate a service-side beam based on the geometry.

22. An apparatus for wireless communication by a configurable repeater, comprising:
  a memory; and
  at least one processor coupled to the memory, the at least one processor configured:
    to collect sensor information associated with an environment of the repeater;
    to receive control information from a control node for a repeating operation; and
    to repeat a wireless signal received from a first device towards a second device in accordance with the control information and the sensor information, the wireless signal transmitted via a beam configuration that is dynamically based on the sensor information.

23. The apparatus of claim 22, in which the sensor information comprises at least one of radar data, LiDAR data, radio frequency (RF) power measurement data, or image data.

24. The apparatus of claim 22, in which the at least one processor is further configured to transmit the sensor information to the control node, the control information comprising a configuration based on the sensor information.

25. The apparatus of claim 24, in which the configuration is based on additional sensor information received from a plurality of devices.

26. The apparatus of claim 22, in which the control information comprises a map of the environment.

27. The apparatus of claim 22, in which the control information comprises a repeater configuration including at least one of an on/off state, a beam forming configuration, a power configuration, a time division duplexing (TDD) pattern, a bandwidth configuration, or a timing adjustment configuration.

28. The apparatus of claim 22, in which the at least one processor is further configured:
  to locate a donor node based on at least one of the sensor information or the control information; and
  the beam configuration comprises a fronthaul beam directed towards the donor node.

29. The apparatus of claim 22, in which at least one of the control information and the sensor information indicates an area with a donor node coverage level below a threshold value; the beam configuration comprising a service-side beam directed towards the area.

30. The apparatus of claim 22, in which at least one of the control information and the sensor information indicates an opening on a building facade; the beam configuration comprising a service-side beam directed towards the opening.

* * * * *